United States Patent
Hurd

[15] 3,657,763
[45] Apr. 25, 1972

[54] TOOL SHEATH

[72] Inventor: Raymond M. Hurd, 2548 South 78th, Milwaukee, Wis. 53219

[22] Filed: Oct. 6, 1969

[21] Appl. No.: 864,129

[52] U.S. Cl..................................15/268, 134/104, 184/1, 269/16
[51] Int. Cl.........................................A01g 3/04, F16n 7/28
[58] Field of Search.....................211/71; 184/1; 4/276, 277, 4/275, 285, 120, 142, 110; 269/16, 15; 15/257, 268; 150/1; 118/429; 248/37.3, 314, 94; 134/104, 201

[56] References Cited

UNITED STATES PATENTS 2,671,906   3/1954   Potts.....................................4/142 X
3,164,186   1/1965   Weber et al............................4/110 X Primary Examiner—Leon G. Machlin
Attorney—Andrus, Sceales, Starke and Sawall

[57] ABSTRACT

A sheath providing for cleaning, lubricating and storage is disclosed for a tool such as a hedge clipper having relatively moving blades driven by a motor unit. The sheath opens upwardly to provide a lip for the support of the motor unit while the blades project downwardly into a blade immersion chamber filled with a suitable cleaner-lubricant. A sediment collecting chamber is disposed beneath and connected to the blade immersion chamber by a vertical passageway means. The sediment collecting chamber is removable to provide for periodic cleaning of the dirt and debris settling therein.

5 Claims, 2 Drawing Figures

Patented April 25, 1972
3,657,763
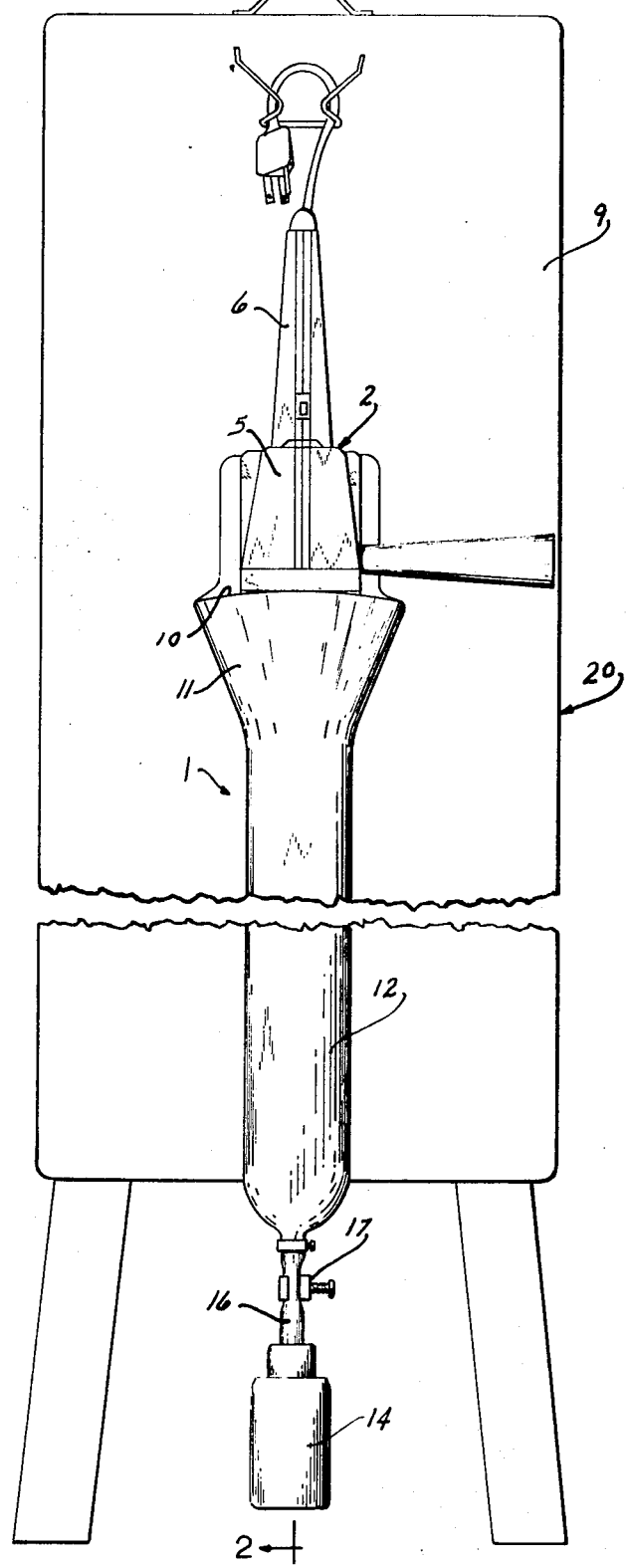
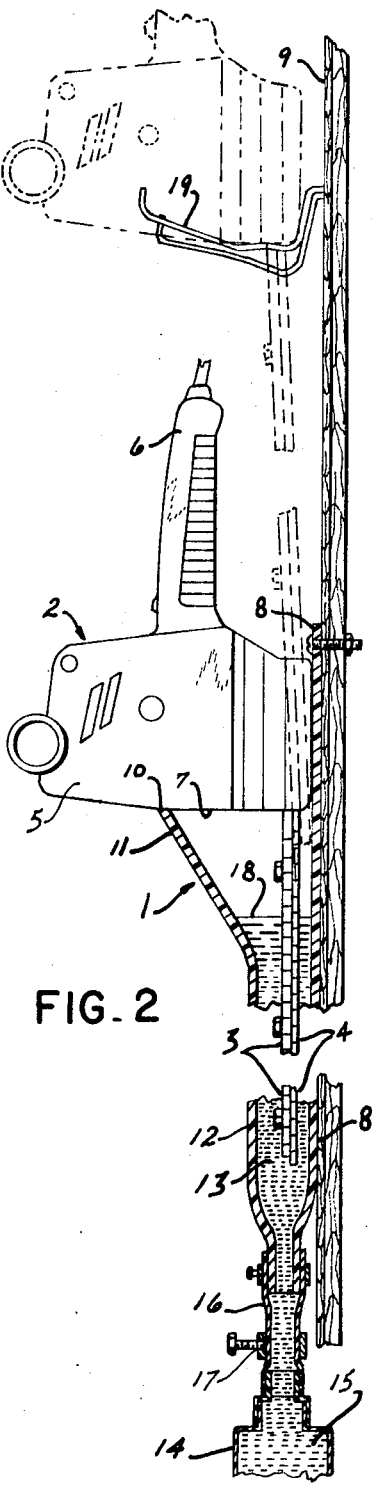
INVENTOR.
RAYMOND M. HURD
BY
Andrus, Sceales, Starke, & Sawall
Attorneys

> # 3,657,763

TOOL SHEATH

BACKGROUND OF INVENTION

This invention relates to a sheath adapted to provide for cleaning, lubrication and storage of a tool such as a hedge clipper.

A hedge clipper is generally constructed with a pair of relatively sliding blades one or both of which are reciprocatingly driven by a drive motor. Cleanliness and lubrication of the blades are essential to insure proper operation of the tool. It is generally an object of this invention to provide a sheath wherein such a hedge clipper may be operated with the blades immersed in a suitable cleaner-lubricant to clean and lubricate the blades and which will serve for storage of the tool when not in use.

SUMMARY OF INVENTION

Generally the present invention is directed to a sheath which is open upwardly to receive a tool such as a bladed hedge clipper. The sheath portion adjacent to the upper opening is adapted to support the motor unit of the tool while the blades project downwardly into an elongated blade immersion chamber adapted to be filled with a suitable cleaner-lubricant. A sediment collecting chamber is disposed beneath and connected to the blade immersion chamber by a vertical passageway means. The sediment collecting chamber is removable to provide for periodic cleaning.

DRAWING DESCRIPTION

The drawings furnished herewith illustrate the best mode presently contemplated for carrying out the invention and described hereinafter.

In the drawings:

FIG. 1 is a front elevational view of the sheath of this invention with a hedge clipper supported therein; and FIG. 2 is a section taken generally on line 2—2 of FIG. 1, and in phantom shows the hedge clipper supported from a bracket above the sheath for drainage of lubricant.

DESCRIPTION OF ILLUSTRATED EMBODIMENT

Referring to the drawings, the sheath 1 of this invention is adapted to provide for the cleaning, lubrication and storage of a tool such as the hedge clipper 2 having a pair of relatively sliding blades 3 and 4 one or both of which are reciprocatingly driven by the motor 5 incorporated in the handle structure 6 of the tool. The sheath 1 is preferably fabricated of plastic and has an upwardly facing mouth 7 for receiving the tool.

Rearwardly the sheath 1 is provided with a generally vertical wall portion 8 to permit convenient and stable mounting onto a wall 9. The wall portion 8 projects upwardly beyond the mouth 7 of the sheath where one or more fasteners make securement to the wall 9 such that the sheath 1 of the assembly defines a support unit for holding of the tool as presently described.

With the flat vertical wall portion 8 at the rear, the mouth 7 of the sheath 1 is a generally semicircular opening providing a forwardly disposed upper lip 10 defining an upper portion on which the motor unit 5 of the tool is supported. From the mouth 7, the sheath 1 extends inwardly and downwardly generally in the form of a half-funnel to provide an upper tapered sheath portion 11. At the lower end of tapered portion 11, the sheath 1 continues downwardly to form an elongated portion 12 which provides the blade immersion chamber 13. The blades 3 and 4 project into the chamber 13 when the motor unit 5 of the tool is seated on the lip 10 at the top of the tapered sheath portion 11.

A flexible transparent bulb 14 which forms a sediment collecting chamber 15 is disposed beneath and connected to the lower end of the blade immersion chamber 13 through the flexible conduit 16. The conduit 16 is normally open to place the chamber 13 and 15 in communication with each other by means such as a hose clamp 17 are provided to selectively collapse the conduit to seal the blade immersion chamber.

When it is desired to clean and lubricate the blades 3 and 4, the tool is disposed in the sheath 1 which is filled with a suitable detergent oil to a level 18 spaced a short distance beneath the lip 10. Seated in the sheath 1 the tool is operated to loosen any dirt and debris clinging to or trapped between the blades 3 and 4 to thereby clean and simultaneously lubricate the blades. The seated motor unit 5 generally closes the mouth 7 of the sheath 1 to substantially prevent the lubricant from splashing out of the sheath during operation for cleaning. If the hedge clipper tool is to be placed into immediate service following cleaning, the tool may be suspended for a short period from the wall bracket 19 above the sheath 1 to allow the excess lubricant to drain back into the sheath.

The dirt and debris removed from the blades 3 and 4 during operation of the tool in the sheath settles to the bottom and passes through the conduit 16 into the sediment collecting chamber 15 in the bulb 14. The bulb 14 is removable from the conduit 16 to permit periodic cleaning of the chamber 15.

When it is desired to clean the sediment collecting chamber 15, the flexible bulb 14 may be manually depressed to force at least some of the lubricant therein back up into the blade immersion chamber 13. Flexing of the bulb 14 may also be resorted to dislodge any dirt and debris which may become hung up in the conduit 16 or the entrance thereto in the blade chamber 13.

With the bulb 14 depressed in contemplation of removal for cleaning, the hose clamp 17 is closed to collapse the conduit 16 and seal the blade immersion chamber 13. After the blade chamber 13 is sealed, the bulb 14 may be removed. The bulb 14 is reinstalled on the lower end of conduit 16 following cleaning and the hose clamp 17 is opened to reestablish communication between the blade chamber 13 and the sediment collecting chamber 15.

The wall 9 on which the sheath 1 is mounted may comprise a portable rack 20 or the like which may be carried to the hedge trimming site. With the sheath 1 available at the hedge trimming site, periodic cleaning and lubrication of the blades 3 and 4 as hedge trimming progresses generally prevents blade foul-up and assures the proper operation of the tool.

During the periods when the hedge clipper tool is not is use, the sheath 1 provides for convenient storage of the tool in a manner to insure its proper working order when next placed in use.

I claim:

1. In a sheath for a tool, said tool having an elongated blade unit projecting from a handle unit, a support unit receiving said tool and having an upper portion engaged by said handle unit to support the tool in said sheath and said support unit having an open top elongated chamber with walls projecting downwardly from said upper portion and generally conforming to the blade configuration and into which said blade unit freely projects in spaced relation to the chamber walls with the tool disposed and supported in said support unit, said chamber being substantially closed and adapted to contain a suitable lubricant in which the blade unit may be operated to clean and lubricate said blade unit, a sediment collecting chamber, and a vertical passageway means connecting said sediment collecting chamber and said blade chamber, said sediment collecting chamber including a removable portion to provide for periodic cleaning.

2. The invention as set forth in claim 1, wherein said sediment collecting chamber is formed of a flexible material which may be compressed to transfer lubricant therein back into the blade chamber prior to removal and cleaning of the sediment collecting chamber.

3. The invention as set forth in claim 1, wherein at least a portion of the passageway means connecting the blade chamber and the sediment collecting chamber is selectively collapsible to effect a seal between said chambers.

4. The invention as set forth in claim 3, wherein releasable clamp means are associated with the passageway means to selectively open and close the passageway means.

5. The invention as set forth in claim 1, wherein the sheath is mounted on a portable rack which may be carried to the work site.

* * * * *